United States Patent [19]

Ishii et al.

[11] 4,046,580

[45] Sept. 6, 1977

[54] SILICON NITRIDE-BASED SINTERED MATERIAL AND METHOD FOR MANUFACTURING THE SAME

[75] Inventors: Takashi Ishii, Tokyo; Katsutoshi Nishida, Yokohama; Michiyasu Komatsu, Yokohama; Akihiko Tsuge, Yokohama, all of Japan

[73] Assignee: Tokyo Shibaura Electric Co., Ltd., Kawasaki, Japan

[21] Appl. No.: 590,073

[22] Filed: June 25, 1975

[30] Foreign Application Priority Data

June 28, 1974 Japan .................................. 49-73283
July 5, 1974 Japan .................................. 49-76430

[51] Int. Cl.$^2$ ...................... C04B 35/50; C04B 35/58
[52] U.S. Cl. ................................... 106/55; 106/73.2
[58] Field of Search .............................. 106/73.2, 55

[56] References Cited

U.S. PATENT DOCUMENTS

| | | | |
|---|---|---|---|
| 3,108,887 | 10/1963 | Levie et al. | 106/65 |
| 3,830,652 | 8/1974 | Gazza | 106/73.2 |
| 3,833,389 | 9/1974 | Komeya et al. | 106/55 |

Primary Examiner—Winston A. Douglas
Assistant Examiner—Mark Bell
Attorney, Agent, or Firm—Oblon, Fisher, Spivak, McClelland & Maier

[57] ABSTRACT

Disclosed is a silicon nitride-based sintered material having high heat resistance and containing crystal compounds prepared from the silicon nitride and at least one of oxides of the elements belonging to the III A group in the periodic table.

9 Claims, 9 Drawing Figures

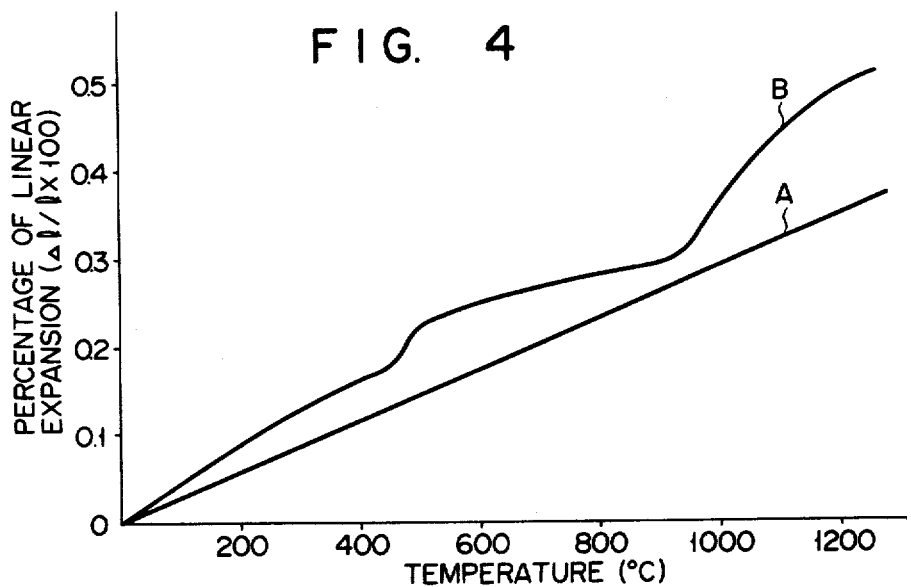
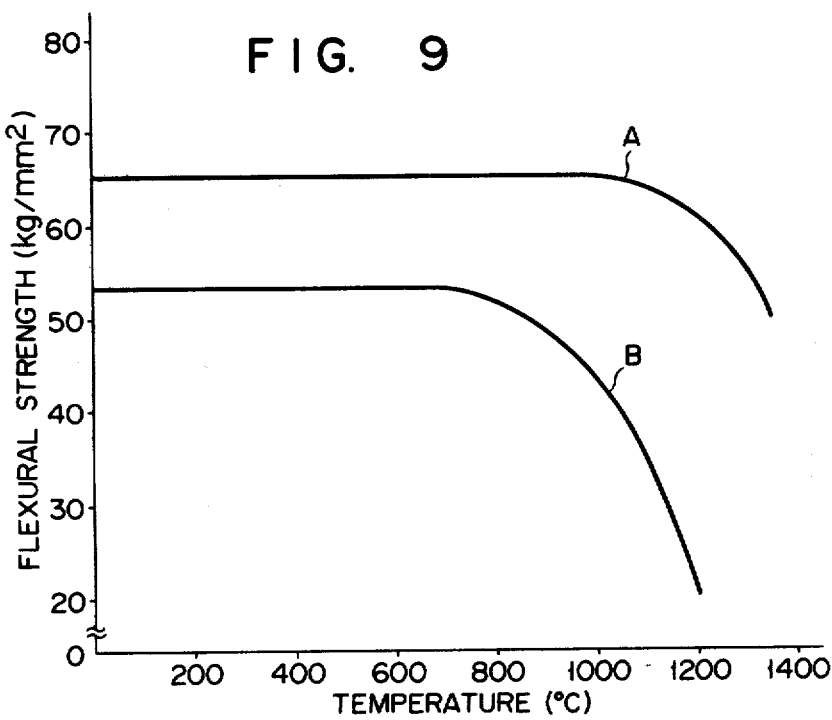

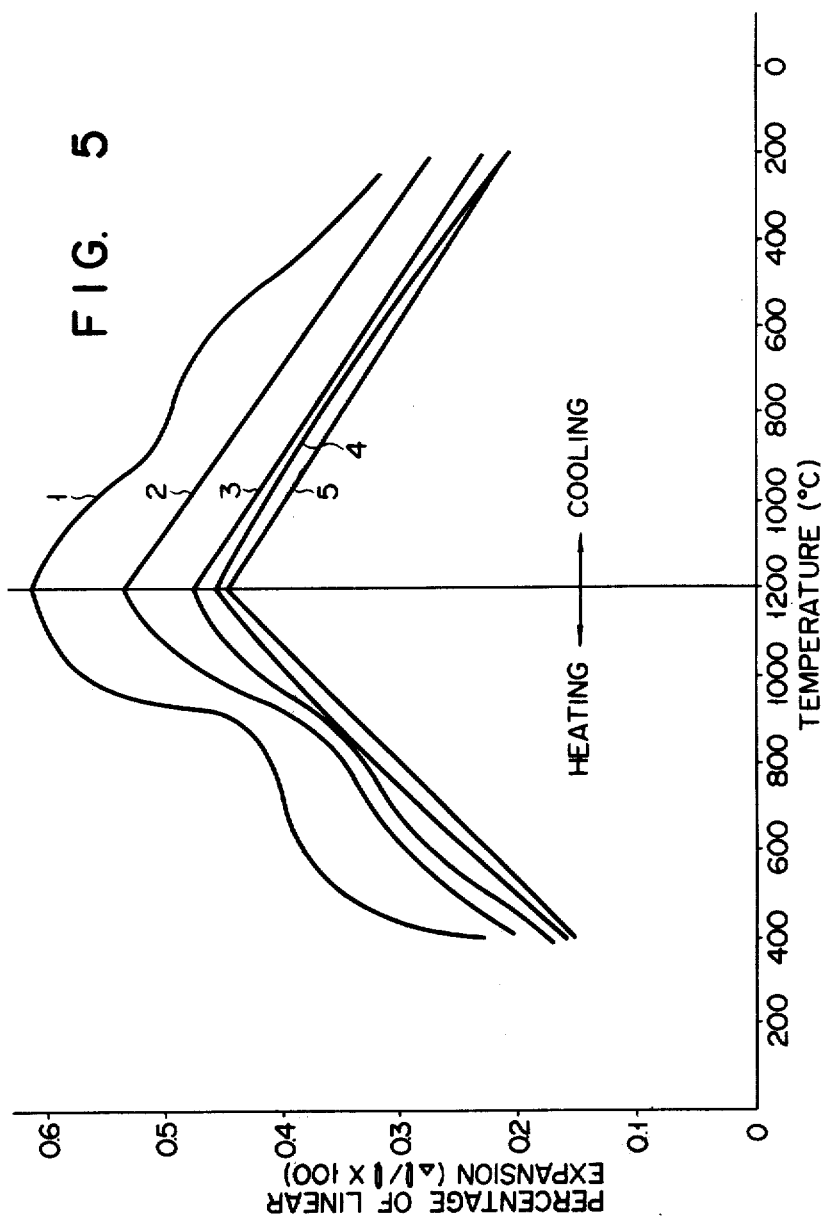

SILICON NITRIDE-BASED SINTERED MATERIAL AND METHOD FOR MANUFACTURING THE SAME

This invention relates to a novel heat resistant sintered material mainly consisting of silicon nitride which is hereinafter referred to as "silicon nitride-based sintered material" and a method for manufacturing the same.

Recently, with the scientific development and remarkably advanced exploitation in a high temperature area including jet engine, rocket, atomic power generation, MHD (magneto hydro dynamics) or the like, there is rapidly increased a demand for the exploitation of a high load-resistible material in such high temperature area. Particularly in a technical field of jet engine, rocket, or the like the high heat resistant material exploitation as well as the design improvement is being eagerly made for the purpose of rendering such engine, rocket or the like operative under much higher temperature. Under these circumstances, attention has in recent years been paid to silicon nitride as a new heat resistant material, and many countries in the world are now conducting studies and exploitations concerning the silicon nitride. As well known, silicon nitride as a single substance is capable of being little sintered even when subjected to heat treatment at high temperature, and accordingly the resulting sintered material has no sufficient mechanical strength. As a result, there has been reported, in order to obtain a silicon nitride sintered material having high mechanical strength, a method of adding a sintering aid to the silicon nitride and subjecting the resulting mass to heat treatment. For instance, British Pat. No. 970,639 discloses a silicon nitridebased sintered material produced by sintering under pressure silicon nitride and magnesium oxide or the like, British Pat. No. 1,092,637 a silicon nitride-based sintered material produced by pressure-sintering α-type silicon nitride and magnesium oxide or the like, and U.S. Pat. No. 3,409,417 a silicon nitride-based sintered material produced by sintering silicon nitride and magnesium nitride or the like. But these silicon nitride-based sintered materials have not yet had sufficient properties as heat resistant materials, and a deterioration of their mechanical properties particularly in a region of high temperature is their most outstanding drawback. For instance, a silicon nitride sintered material obtained through reaction-sintering has a flexural strength of approximately 38 kg/mm² under a temperature of 1300° C, and a silicon nitride-based sintered material obtained by adding magnesium oxide as a sintering aid to silicon nitride and pressure-sintering the resulting mass has a flexural strength of approximately 63 kg/mm² under a temperature of 1300° C. These values are the greatest of all that are presently known.

Recently, the fact that oxides of rare earth elements are also effective as sintering aids being added to silicon nitride has been recognized (British Pat. No. 1,312,315), and it has been proved that silicon nitride-based sintered materials obtained by adding these oxides have excellent mechanical and thermal properties as compared with a prior art sintered material. But such silicon nitride-based sintered materials have the shortcoming that their flexural strength is rapidly decreased under a high temperature of 1000° C or more. Hereinafter, these silicon nitride-based sintered materials are explained by taking as an example a silicon nitride-based sintered material obtained by adding yttrium oxide which is a representative sintered material.

The above-mentioned silicon nitride-based sintered material is manufactured by mixing a proper amount of yttrium oxide powder with a silicon nitride powder and molding the resulting mass to obtain a primary molding and transferring the primary molding into a carbon mold and pressure-sintering the same under a temperature of 1600° to 1850° C. The flexural strength of a silicon nitride-based sintered material obtained using the prior art method, as measured under a temperature ranging from room temperature to 1400° C, is shown by B in FIG. 1. As seen from FIG. 1, the flexural strength of the prior art sintered material is rapidly decreased under a temperature of 1000° C or more and this sintered material has, under a temperature of 1300° C, a flexural strength value equal to approximately 40% of that under room temperature. Though the flexural strength curve of the prior art sintered material presents a small fluctuation depending upon the amount of yttrium oxide added, this curve pattern remains unchanged. It is judged that the above-mentioned fact that the flexural strength curve of the silicon nitride-based sintered material presents a decay under a temperature of 1000° C or more depends upon the presence of a non-crystalline substance in the sintered material for the following reasons. That is to say, each of powder particles of silicon nitride as the starting material is considered as being covered with an oxide layer or silicon oxide layer, and accordingly it is considered that substances each comprising silicon oxide-yttrium oxide obtained by reaction of the silicon oxide with the yttrium oxide added thereto exist in the sintered material. Among such substances there is the one having a melting point of nearly 1660° C. Therefore, in the proximity of this temperature the silicon oxide-yttrium oxide substance promotes sintering of the silicon nitride to densify the resulting sintered material. When, however, this resulting sintered material is analyzed by X-ray diffraction, the presence of any phase as pertaining to the yttrium oxide is not recognized. This is the first reason. Further, when comparison is made between the high temperature-fracture surface and the room temperature-fracture surface of the above-mentioned silicon nitride-based sintered material, the high temperature-fracture surface presents intergranular breakage, while the room temperature-fracture surface presents a transgranular breakage. This is the second reason. For the first and second reasons it is judged that the above-mentioned decrease in flexural strength under a temperature of 1000° C or more is attributed to the existence of a grain-boundary non-crystalline substance, i.e., a glass phase.

The foregoing description is made by taking as an example the silicon nitrideyttrium oxide sintered material, b ut it has been proved that a silicon nitride-based sintered material obtained by adding other oxides of rare earth elements than the yttrium oxide also presents the same result as shown above. Further, with respect to the existence of said non-crystalline substance consideration has been given only to the silicon oxide-yttrium oxide substance, but a non-crystalline substance of an oxide-nitride substance obtained by substituting silicon nitride for part of the silicon oxide is considered to be contained in the silicon nitride-based sintered material. In this case, however, the authenticity of the above-mentioned considerations remains unaffected.

As above described, a decrease in mechanical strength of the prior art silicon nitride-based sintered material in a region of high temperature originates in the existence of a non-crystalline substance as a grain boundary phase. Accordingly, in order to prevent a mechanical strength decrease in a region of high temperature it is necessary (1) to wholly change such non-crystalline substance in the silicon nitride-based sintered material into some other substance or remove it, (2) to partially draw out it from the silicon nitride-based sintered material, or (3) to partially change it into some other substance. In the case of the above (2) and (3) there results a substantial increase in the melting point of such non-crystalline substance.

The methods for crystallizing a non-crystalline substance, that is to say, the methods for removing the aforesaid non-crystalline substance generally include a method for adding to the non-crystalline substance substances capable of promoting the formation of crystal nucleus such as noble metals, oxides, fluorides or the like, a method for, in case of an unstable non-crystalline substance, appropriately heating or cooling it, etc. In case of a material comprising silicon nitride, however, it was difficult to reliably achieve its crystallization using the aforesaid methods.

An object of the invention is to provide a novel silicon nitride-based sintered material which has an excellent heat resistance.

Another object of the invention is to provide a new effective method for crystallizing a non-crystalline substance in the silicon nitride-based sintered material.

Still another object of the invention is to provide turbine parts which are useful particularly in an area of high temperature.

The silicon nitride-based sintered material of the invention having excellent heat resistance is characterized by containing crystal compounds prepared from silicon nitride and at least one of oxides of a rare earth element. The silicon nitride-based sintered material of the invention is manufactured by subjecting a molded mass of silicon nitride and at least one of said oxides to heat treatment in the presence of aluminium nitride.

This invention can be more fully understood from the following detailed description when taken in conjunction with the accompanying drawings, in which:

FIG. 4 is a characteristic curve diagram illustrating the respective thermal expansion properties of the silicon nitride-based sintered material of the invention and the prior art silicon nitride-based sintered material with the percentage of expansion plotted on the ordinate and temperature on the abscissa;

FIG. 5 is a characteristic curve diagram illustrating the mutual relation between three factors—temperature and the respective crystallization degrees and thermal expansion properties of the silicon nitride-based sintered material of the invention and the prior art silicon nitride-based sintered material;

Figure 8:
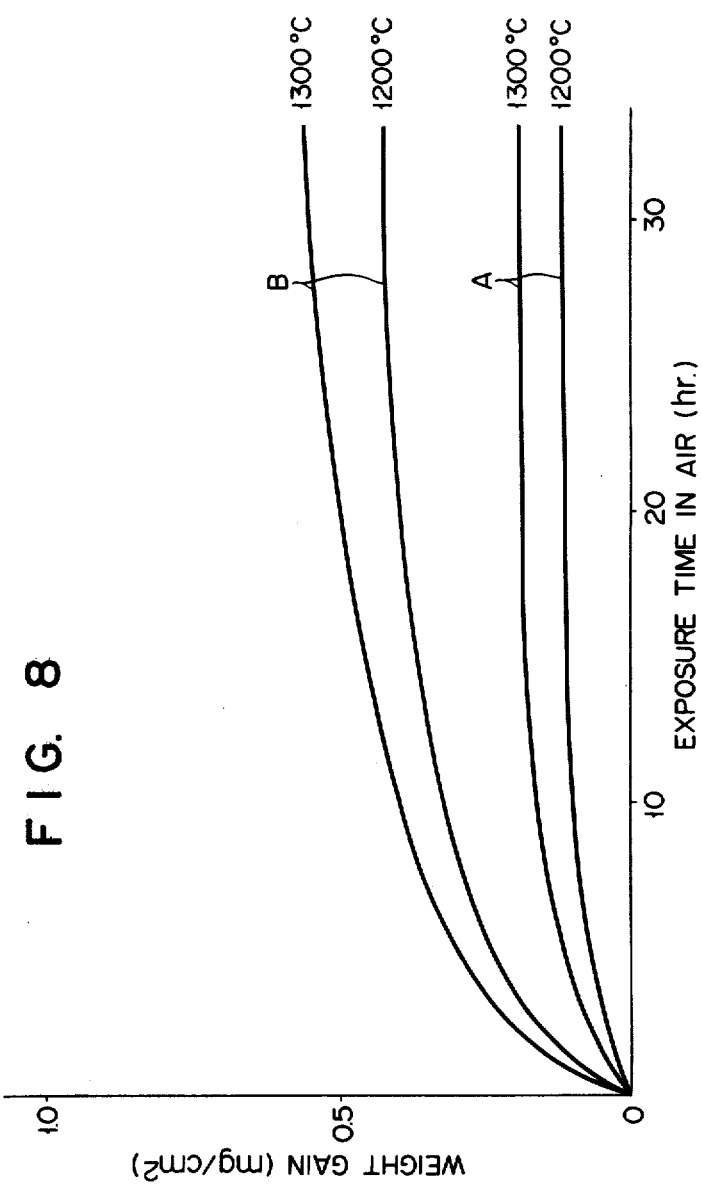

FIG. 8 is a characteristic curve diagram showing the respective oxidation resistances of the sintered material of the invention obtained in Example 2 and the prior art sintered material; and FIG. 9 is a characteristic curve diagram illustrating the relation between the respective flexural strengths of a sintered material of the invention obtained in Example 6 and the prior art sintered material, and temperature.

A silicon nitride-based sintered material of the invention which is characterized by containing crystal compounds prepared from silicon nitride and at least oxide of a rare earth element is manufactured by subjecting a molded mass of silicon nitride and at least one of said oxide to heat treatment in the presence of aluminium nitride thereby to crystallize that portion of the resulting mass which is to become a non-crystalline substance.

A silicon nitride as the starting material may be either of $\alpha$-type silicon nitride or $\beta$-type silicon nitride, and if only it has a purity on the order of the purity of a silicon nitride commercially available, it will well serve the purpose. A powder of the silicon nitride preferably has a particle size of $5\mu$ or less.

Rare earth elements useful in the practice of this invention are scandium (Sc), yttrium (Y) and fifteen elements of atomic numbers 57 to 71--lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tu), ytterbium (Yb), and lutecium (Lu). In the method of the invention, oxides of these elements may be used in a single form or in a combined form of two or more. Among these oxides yttrium oxide is most preferable. The purity and particle size of a powder of each such oxide can be on the order of those of the silicon nitride powder.

In order to cause the above-mentioned crystallization, it is preferable that a molded mass of the silicon nitride powder and a powder of said oxide or oxides be subjected to heat treatment in the presence of aluminum nitride, and the methods for applying the aluminum nitride to that molded mass of the silicon nitride powder and the oxide powder which is to be sintered include:

1. a method for effecting said application by directly contacting the aluminum nitride with a molded mass obtained by primary-molding a mixed powder of the silicon nitride powder and the oxide powder using the usual method as in the case where said molded mass is embedded into an aluminum nitride powder or a powder comprising the aluminum nitride, 2. a method for effecting said application without directly contacting said molded mass with the aluminum nitride as in the case where said molded mass and an aluminum nitride molding are disposed in a furnace in a spaced manner from each other, and 3. a method for effecting said application by directly mixing a proper amount of the aluminum nitride powder with said mixed powder. This amount of the aluminum nitride to be mixed preferably ranges from 0.1 weight % to 5.0 weight %.

The methods for applying the aluminum nitride are not limited to the above-mentioned methods, but may include any method if only it is capable of causing the previously mentioned crystallization by using the aluminum nitride.

The method of the invention is not limited to the method using the aluminum nitride but may include any method if only it is capable of obtaining a silicon nitride-based sintered material containing crystal compounds prepared from silicon nitride and at least one of the above-mentioned oxides.

The temperature for the aforesaid heat treatment usually ranges from 1500° to 1850° C, but should be properly selected in accordance with the kind of those oxides of the rare earth element which is to be employed. For example, in case of a silicon nitride-based sintered material containing yttrium oxide, since a crystal compound $Si_3N_4Y_2O_3$ produced through crystallization has a melting point of approximately 1850° C, it is preferable that the heat treatment be carried out at a temperature lower by approximately 50° to 100° C than this melting point, namely at a temperature of approximately 1650° to 1800° C. Similarly, in case of a silicon nitride-based sintered material containing other oxides of the III A group elements than yttrium oxide, it is preferable that the heat treatment be conducted at a temperature lower by approximately 50° to 200° C than the melting point of a crystal compound of the silicon nitride and at least one of said other oxides.

A non-crystalline portion of the silicon nitride-based sintered material obtained using the method of the invention is more reduced in amount as compared with that of a silicon nitride-based sintered material obtained using the prior art method or is completely removed, and the silicon nitride-based sintered material of the invention presents excellent mechanical and thermal properties under high temperature. By analyzing the silicon nitride-based sintered materials of the invention using the X-ray diffraction method it has been confirmed that they contain a lot of crystal compounds prepared from the silicon nitride and oxides of the III A group elements. For instance, the silicon nitride-based sintered material containing yttrium oxide contains a crystal compound $Si_3N_4.Y_2O_3$ wherein the molar ratio of the silicon nitride to the yttrium oxide is 1:1, a crystal compound $Si_3N_4.2Y_2O_3$ wherein said molar ratio is 1:2, and a crystal compound $Si_3N_4.3Y_2O_3$ wherein said molar ratio is 1:3, and is considered to further contain various kinds of crystal compounds similar to the above-mentioned crystal compounds. Since, however, other crystal compounds than $Si_3N_4.Y_2O_3$ are relatively unstable, this $Si_3N_4.Y_2O_3$ usually exists in said silicon nitride-based sintered material. Hereinafter, explanation is made by taking as an example the most representative silicon nitride-yttrium oxide based sintered material.

The crystal compound $Si_3N_4.Y_2O_3$ belongs to a tetragonal system whose lattice constant is such that $a = 7.603A$ and $c = 4.910A$ and whose space group is P $42_12$ and which has two chemical equivalents per unit cell.

Figure 2:
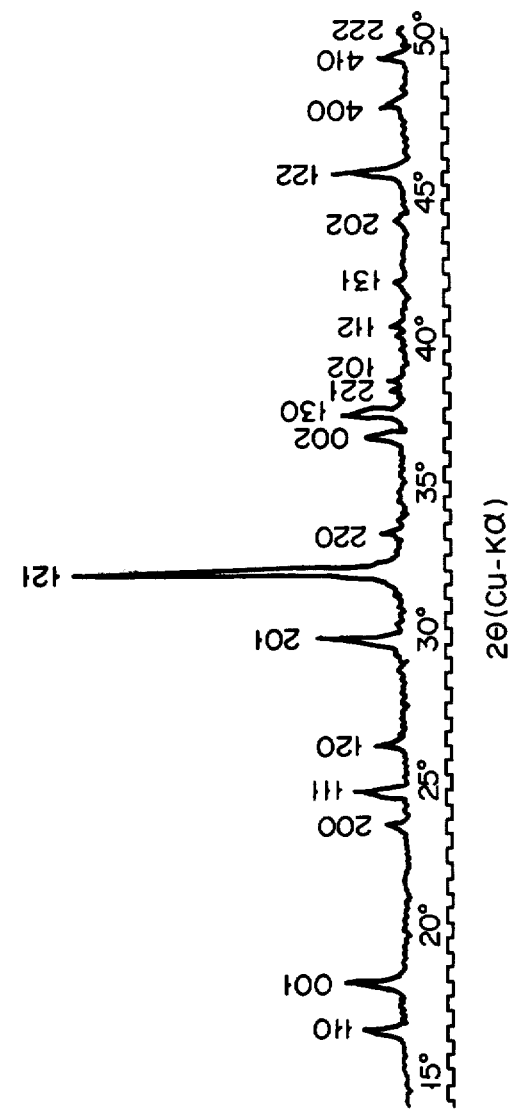
FIG. 2 is a powder X-ray diffraction pattern of a crystal compound of $Si_3N_4 \cdot Y_2O_3$.

The powder X-ray diffraction pattern of this crystal compound is shown in FIG. 2.

An intimate relationship has been found to exist in between the mechanical property of the silicon nitride-based sintered material in a region of high temperature and the content of said crystal compounds in this sintered material.

In the case of discussing the crystal compounds as including those having the above-mentioned various molar ratios, the proportion of such crystal compounds in the silicon nitride-based sintered material can be expressed as follows.

$$C(\%) = Y_1/Y_0 \times 100$$

where C: the weight percentage of the amount of yttrium in the crystal compounds, i.e., the crystalline phase based on the total amount of yttrium in the sintered material (hereinafter referred to as "crystallization degree")

$Y_1$: the weight of yttrium in the crystalline phase $Y_0$: the total weight of yttrium in the sintered material.

The crystallization degree is determined, in accordance with the above equation, by determining the total amount of yttrium present in the sintered material through chemical analysis and determining the amount of yttrium in the crystalline phase using the X-ray diffraction or microstructural analysis. A silicon nitride-based sintered material having a crystallization degree of 50 weight % or more is a preferable one having particularly excellent heat resistance.

Figure 3:
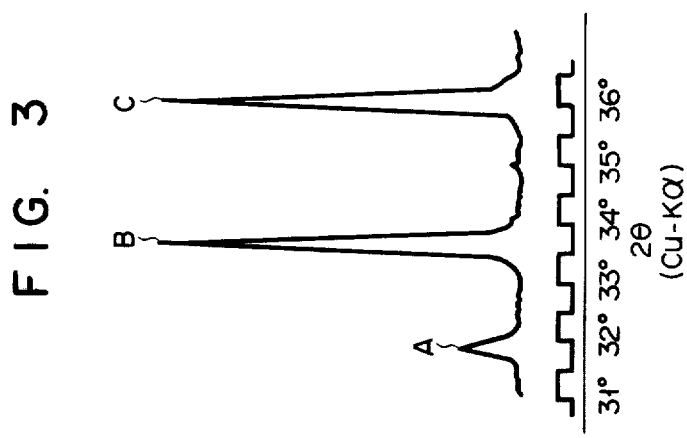
FIG. 3 is a powder X-ray diffraction pattern of the silicon nitride-based sintered material of the invention containing therein the crystal compound of $Si_3N_4 \cdot Y_2O_3$.

The $Si_3N_4.Y_2O_3$ is the most stable of the above-mentioned various crystal compounds, and therefore an intimate relationship exists also in between the amount of $Si_3N_4.Y_2O_3$ contained as a main component in the silicon nitride-based sintered material and the mechanical property of the silicon nitride-based sintered material in a region of high temperature. As means for detecting the amount of the $Si_3N_4.Y_2O_3$ contained in the silicon nitride-based sintered material the powder X-ray diffraction method is mostly effective, and even where the $Si_3N_4.Y_2O_3$ is not detected by other means, the $Si_3N_4.Y_2O_3$ has been found to be effective in improving the high temperature property of the silicon nitridebased sintered material if only detected by the powder X-ray diffraction. In the powder X-ray diffraction of the silicon nitride-based sintered material containing the $Si_3N_4.Y_2O_3$, the ratio of the diffraction intensity value of that (121) plane of the $Si_3N_4.Y_2O_3$ having the highest X-ray diffraction intensity in the diffraction pattern to the diffraction intensity value either of that (101) plane or (210) plane of the silicon nitride ($\beta$-$Si_3N_4$) in said sintered material where the diffracted X-ray has the highest intensity or to an average value of the diffraction intensity values both at the (101) and (210) peaks (this ratio is hereinafter referred to as "highest X-ray diffraction intensity" ratio), is most closely related to the high temperature property of said sintered material. That is to say, in the present invention, a sintered material having a "highest X-ray diffraction intensity" ratio of 0.02 to 2.00 is a preferable one having a particularly excellent heat resistance. FIG. 3 illustrates a typical powder Xray diffraction pattern of the silicon nitride-based sintered material containing therein the $Si_3N_4.Y_2O_3$ compound. In FIG. 3, A represents the diffraction peak of the (121) plane of the $Si_3N_4.Y_2O_3$ compound, B the diffraction peak of the (101) plane of the $\beta$-$Si_3N_4$ compound, and C the diffraction peak of the (210) plane of the $\beta$-$Si_3N_4$ compound. In the prior art silicon nitride-based sintered material, the peak A does not appear in its powder X-ray diffraction pattern. In the sintered material of the invention, the lower its porosity, the higher its mechanical strength under high temperature, as in the case of the prior art sintered material, and the relation between its porosity and mechanical strength is recognized to coincide with that expressed by the well known equation:

$$S = S_o \exp(-kp)$$

where $S$ represents the mechanical strength, $p$ the porosity, $S_o$ the mechanical strength when $p = 0$, and $k$ a constant.

Where a densified silicon nitride-based sintered material of the invention having particularly a low prosity is required, it is preferable to perform additionally the pressing operation when the sintered material is heat-treated, or to further subject the sintered material as crystallized to hot-pressing.

Figure 1:
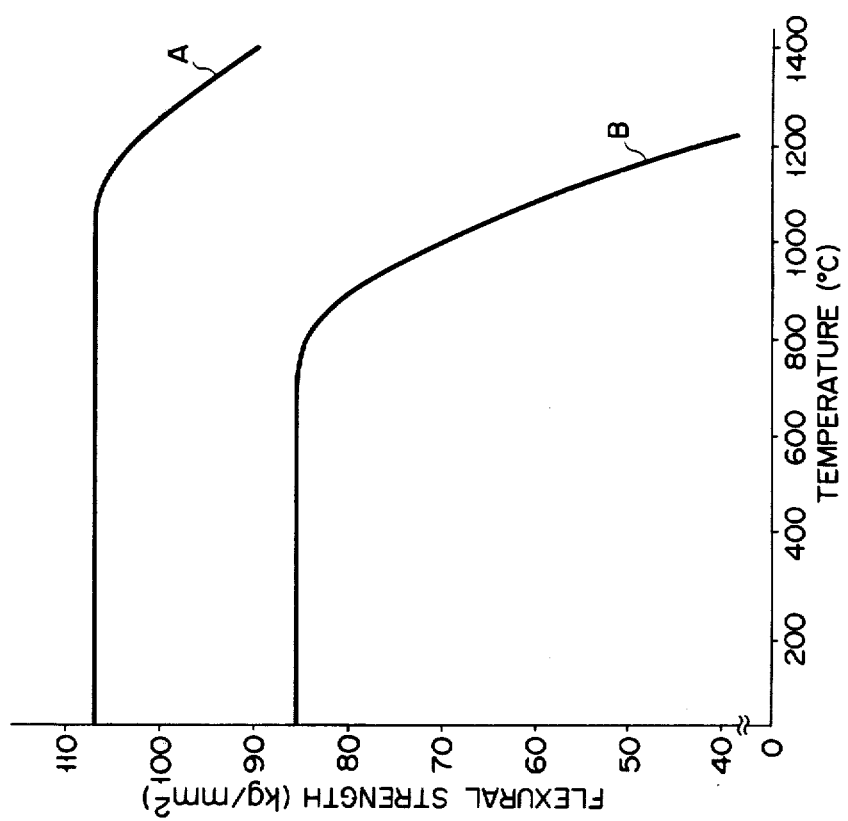
FIG. 1 is a characteristic curve diagram illustrating the relation between the respective flexural strengths of a silicon nitride-based sintered material of the invention and a prior art silicon nitride-based sintered material, and temperature.

Next, the high temperature properties of the silicon nitride-based sintered material of the invention are explained. The flexural strength of the representative silicon nitride-based sintered material of the invention is diagramatically shown by A in FIG. 1. The effect of the invention will be self-evident from its comparison with the prior art silicon nitride-based sintered material shown by B in FIG. 1. The flexural strength measurement was carried out using the three-point bending method under the following conditions:

| | |
|---|---|
| Span | 20 mm |
| Crosshead speed | 0.5 mm/min. |
| Sample size | 3 mm × 3 mm × 40 mm |

Further, as an example of the high temperature properties of the sintered material its thermal expansion property is diagramatically shown in FIG. 4, with the percentage of expansion plotted on the ordinate, said percentage of expansion being expressed by $\Delta l/l_0 \times 100$ where $l_0$ represents the length of a sample under room temperature and $\Delta l$ an increment in the sample expansion under a certain temperature. In FIG. 4, A and B denote the silicon nitride-based sintered material of the invention and the prior art silicon nitride-based sintered material, respectively. The curve B has bended portions possible with a silicon nitride-based sintered material with a non-crystalline substance comprising the oxide of any III A group-element, whereas the curve A denoting the silicon nitride-based sintered material of the invention has no such bended portions and the coefficient of thermal expansion is also smaller.

The relation between the "highest X-ray diffraction intensity" ratio and the high temperature-flexural strength of the silicon nitride-based sintered material of the invention is shown in Table 1 below.

Table 1

| "Highest X-ray diffraction intensity" ratio | Amount of $Y_2O_3$ added (wt. %) | Flexural strength value at 1300° C (kg/mm²) |
|---|---|---|
| 0.00 | 1 | 45 |
| 0.01 | 3 | 48 |
| 0.02 | 5 | 75 |
| 0.03 | 5 | 78 |
| 0.05 | 2 | 83 |
| 0.11 | 3 | 80 |
| 0.53 | 10 | 75 |
| 1.15 | 25 | 90 |
| 1.63 | 30 | 93 |
| 2.00 | 40 | 79 |
| 2.67 | 45 | 55 |
| 2.82 | 50 | 48 |
| 3.34 | 50 | 40 |

The respective silicon nitride-based sintered materials in Table 1 were prepared by adding 1 to 50 weight % of $Y_2O_3$ to silicon nitride as raw material containing 88% of $\alpha$-$Si_3N_4$ manufactured by Advanced Material Engineering Limited of England. The respective silicon nitride-based raw materials to which $Y_2O_3$ was added in said respective proportions were ground and mixed using n-butanol by an alumina ball in a pot. Thereafter, each powdered mass was drawn out from the pot, and, after dried, was molded by the usual pressing method, under a pressure of 500 kg/cm², into a plate 50 mm in length, 50 mm in width and 10 mm in thickness. Each plate molding was maintained at 1750° C for 0.5 to 3 hours thereby to perform a primary sintering. At this time, the plate molding was embedded in an aluminum nitride powder and maintained using a carbon vessel in an atmosphere of nitrogen gas. In order to further densify the sintered material thus obtained, it was sintered in a carbon mold under a pressure of 150 to 600 kg/cm² at 1750° C for 2 hours. The resulting sintered material was ground and analyzed using the powder X-ray diffraction method. As a result, an $Si_3N_4.Y_2O_3$ phase and a $\beta$-$Si_3N_4$ phase were detected. The aforementioned "highest X-ray diffraction intensity" ratio was widely varied with the amount of $Y_2O_3$ added and the holding time during which the primary sintering was performed. The relation between the "highest X-ray diffraction intensity" ratio and the flexural strength at 1300° C, of each sample is presented in Table 1. Where the "highest X-ray diffraction intensity" ratio is less than 0.02, any contribution of the $Si_3N_4.Y_2O_3$ to the high temperature flexural strength of said resulting sintered material is not substantially recognized irrespective of the amount of $Y_2O_3$ added or other conditions. For example, when the silicon nitride-based sintered materials to each of which $Y_2O_3$ is added to an extent of 5 weight % are compared with each other, no substantial increase in flexural strength is recognized in the case where their "highest X-ray diffraction intensity" ratios are less than 0.02. On the contrary, even the silicon nitride-based sintered material to which $Y_2O_3$ is added to an extent of 2 weight % presents an excellent flexural strength in the case where its "highest X-ray diffraction intensity" ratio is 0.02 or more. Further, when, in the case of the silicon nitride-based sintered materials to each of which $Y_2O_3$ is added to an extent of 30%, the one having a "highest X-ray diffraction intensity" ratio of less than 0.02 is compared with the one having a "highest X-ray diffraction intensity" ratio of 0.02 or more, a substantial difference between both is recognized in respect of the high temperature flexural strength. Where the "highest X-ray diffraction intensity" ratio exceeds 2.00, the amount of $Si_3N_4.Y_2O_3$ contained in the sintered material is increased, so that it becomes impossible to render the property of silicon nitride effective to cause the sintered material to have high density. As a result, such sintered material becomes meaningless as a material having high heat resistance and mechanical strength. Where the amount of $Y_2O_3$ added is approximately 30 weight % and this $Y_2O_3$ wholly crystallized as an $Si_3N_4.Y_2O_3$ compound, a sintered material obtained has a "highest X-ray diffraction intensity" ratio of approximately 2.00. Actually, therefore, the adding amount of $Y_2O_3$ is not more than approximately 30 weight % and preferably is approximately 5 weight % or less.

As previously mentioned, as the method for manufacturing the silicon nitride-based sintered material of the invention a method of subjecting the molded mass of the silicon nitride powder and the oxide powder of a given rare earth element to heat treatment in the presence of aluminum nitride is preferable, but other manufacturing methods may be used which include, for example, a method of adding a compound of $Si_3N_4$ and $Y_2O_3$ to a silicon nitride powder to perform sintering, a method of subjecting this mass to heat treatment, or a method of adding to a silicon nitride powder an yttrium compound capable of producing $Y_2O_3$ through oxidation or decomposition and subjecting the resulting mass to heat treatment thereby to cause both to react with each other, thus to produce an $Si_3N_4 \cdot Y_2O_3$ compound. In the case of using any of the above-mentioned methods, the relation between the "highest X-ray diffraction intensity" ratio and the heat resistance of a sintered material obtained is the same as mentioned above. The yttrium compound usable includes, for example, yttrium formate, yttrium propionate, yttrium butyrate, yttrium palmitate, yttrium glycolate, yttrium lactate, yttrium oxalate, yttrium carbonate, yttrium nitrate, yttrium sulfate or yttrium chloride. A mixed powder of silicon nitride and each of compounds of the rare earth elements contains therein various kinds of impurities resulting from the silicon nitride and compounds as raw materials or mixed into said mixed powder during the manufacturing process thereof, such as oxides or other compounds of iron, aluminum, calcium or the like. But among these impurities the aluminum oxide does not undesirably influence the effect of the invention and may be mixed into said mixed powder if slightly. In this case, the mixed amount of aluminum oxide is desirably 5 weight % or less, but if the mixed amount of aluminum oxide is equal to or less than the amount of each of compounds of the III A group elements, the aluminum oxide will not undesirably influence the effect of the invention even when mixed to an extent of 5 weight % or more. Accordingly, the silicon nitride-based sintered material of the invention may contain a small amount of impurities such as iron, aluminum or calcium.

But it often happens, depending upon the method and conditions adopted, that part of the yttrium compound added to the silicon nitride exists in the silicon nitride-based sintered material, as a noncrystalline substance. In this case, it is desirable, as previously mentioned, from the standpoint of heat resistance such as the high temperature-mechanical strength that yttrium, at least 50 weight % or preferably 70 weight % based on the total amount of yttrium existing in the silicon nitride-based sintered material, exists as a crystalline phase.

The silicon nitride-based sintered material of the invention has excellent properties under high temperature such as high oxidation resistance, high thermal shock resistance or low thermal expansion as well as high mechanical strength under high temperature. Hereinafter, with respect to the silicon nitride-based sintered material of the invention containing an $Si_3N_4 \cdot Y_2O_3$ compound and in addition other various crystalline compounds such as, for example, a $Si_3N_4 \cdot 3Y_2O_3$ and in some cases partially a non-crystalline substance, its relations with the high temperature properties are explained in detail.

A sufficiently high oxidation resistance which is demanded of a sintered material employed in a severe atmosphere where high temperature-oxidation is effected such as the atmosphere of a gas turbine is not obtainable with the prior art sintered material. The silicon nitride-based sintered material of the invention having a crystallization degree of 50% or more, or perferably 70% or more provides an oxidation resistance high enough to meet said demand. With respect to the silicon nitride-based sintered material of the invention prepared by adding yttrium oxide to an extent of 5 weight %, the relation between the variation in its degree of crystallization and the corresponding variation in its oxidation resistance is presented in Table 2. This test was carried out by the method of allowing each sample to stand in a 1200° C-atmospheric air for 48 hours.

Table 2

| Crystallization degree (C %) | Weight gain (mg/cm$^2$) |
|---|---|
| 100 | 0.12 |
| 90 | 0.12 |
| 70 | 0.18 |
| 60 | 0.22 |
| 50 | 0.25 |
| 40 | 0.32 |

The more increased the crystalline phase in the silicon nitridebased sintered material and accordingly the more increased its degree of crystallization, the lower its thermal expansion, and this thermal expansion behavior linearly varies with temperature. FIG. 5 shows the relation between the degree of crystallization and thermal expansion of a silicon nitride-based sintered material obtained by adding yttrium oxide to an extent of 5 weight %. In FIG. 5, numerals 1, 2, 3, 4 and 5 represent the thermal expansion curves of the silicon nitride-based sintered materials having crystallization degrees of 0, 50, 70, 90 and 100 weight % respectively. The curve 1 has a very great bended portion, and accordingly it will be seen that the sintered material having a crystallization of 0 weight %, namely the prior art sintered material is unsuitable for the case where desired to be repeatedly used under the condition of varying temperatures. The sintered materials of the invention denoted by the numerals 2, 3 and 4 are improved in this respect and are sufficiently usable under said condition. Further, the curve 5 does not have any bended portion at all, and accordingly the sintered material of the invention having a crystallization degree of 100 weight % can be used as parts of any complicated mechanism constructed with high precision.

The relation between the degree of crystallization and the critical temperature of difference of thermal shock of the silicon nitride-based sintered material is shown in Table 3. The critical thermal shock test was carried out by submerging into water a silicon nitride-based sintered material obtained by adding yttrium oxide to an extent of 5 weight %.

Table 3

| Crystallization degree (C %) | Critical temperature difference of thermal shock ($\Delta Tc$) |
|---|---|
| 90 | 1050 |
| 70 | 1000 |
| 50 | 980 |
| 30 | 550 |
| 0 | 450 |

As seen from Table 3, the more increased the degree of crystallization, the greater the critical thermal shock value.

The relation between the adding amount of yttrium oxide and the critical temperature difference of thermal shock of a silicon nitride-based sintered material of the invention having a crystallization degree of 99 weight % is shown in Table 4.

Table 4

| Amount of Y$_2$O$_3$ added (wt. %) | Critical temperature difference of thermal shock (ΔTc) |
|---|---|
| 0.5 | 900 |
| 1.0 | 1000 |
| 2.5 | 1000 |
| 5.0 | 1050 |
| 6.0 | 1050 |
| 10.0 | 1000 |

Finally, the relation between the degree of crystallization and the high temperature strength at 1300° C of a silicon nitride-based sintered material obtained by adding yttrium oxide of 5 weight % is shown in Table 5.

Table 5

| Crystallization degree (C %) | High temperature strength at 1300° C (kg/cm$^2$) |
|---|---|
| 100 | 98 |
| 90 | 95 |
| 70 | 95 |
| 50 | 92 |
| 30 | 88 |
| 0 | 42 |

The values of the above respective Tables are those experimentally obtained with respect to the respective concrete examples of the silicon nitride-based sintered materials, and this invention is not limited thereby.

As above explained in detail, the silicon nitride-based sintered material of the invention containing crystal compounds prepared from silicon nitride and at least a rare earth element elements, preferably yttrium oxide, has excellent properties in terms of high temperature-mechanical strength, oxidation resistance, thermal expansion, or thermal shock resistance. Accordingly, the silicon nitride-based sintered material of the invention is particularly suitable as material for a high speed rotary machine used under high temperature such as a turbine. It is well known that a high oxidation resistance is required for such high speed rotary machine such as a turbine. Silicon nitride itself has higher oxidation resistance than metal, and therefore studies are being made of its application to such field. Since, however, the surface of turbine members such as a turbine blade or the like amounts to as high a temperature as 1100° to 1200° C, materials having again higher oxidation resistance are being desired to be exploited. The silicon nitride-based sintered material of the invention is the one having such higher resistance to oxidation under high temperature and offers a great advantage to the above-mentioned application field. However, since the thermal conductivity of silicon nitride is not very high as compared with metal, the temperature difference between, for example, the turbine member surface exposed to high temperature and an interior portion spaced interiorly from said member surface by the extent of scores of, or several hundred of microns is considered to amount to several hundred of centigrades. That is to say, the temperature gradient between the member surface and the member interior portion is estimated to be considerably great and a member destruction due to thermal shock is therefore considered possible as a matter of course. The prior art silicon nitride-based sintered material having a crystallization degree of 0 has a thermal shock resistance (ΔTc) of approximately 450° C and therefore can not be said to be sufficient to use under high temperature. In contrast, the silicon nitride-based sintered material of the invention containing crystal compounds prepared from silicon nitride and yttrium oxide has a thermal shock impulse resistance of approximately 1000° C and therefore is sufficiently resistible to use under high temperature. For instance, a gas turbine member, particularly its blade for an automobile is subjected, when the automobile is started and stopped, to a remarkable thermal shock and mechanical impact. Accordingly, the silicon nitride-based sintered material of the invention having high thermal shock resistance is particularly preferable. Further, the thermal expansion curve of the silicon nitride-based sintered material of the invention is strikingly reduced in respect of the bended portion over a temperature range of 800° to 900° C as compared with that of the prior art silicon nitride-based sintered material having a crystallization degree of 0, and the silicon nitride-based sintered material of the invention includes the one having no bended portion at all. Namely, since the silicon nitride-based sintered material of the invention not only has high thermal shock resistance but also has a little or little thermal distortions, it is suitable to use under high temperature.

This invention will be more fully understood from the Examples which follow.

EXAMPLE 1

Figure 6:
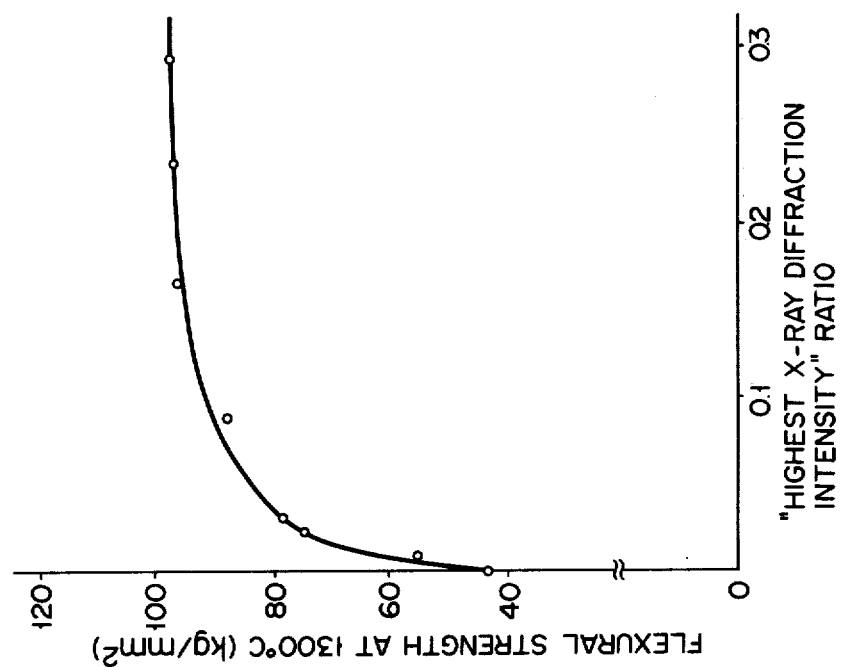
FIG. 6 is a characteristic curve diagram illustrating the relation between the flexural strength and the "highest X-ray diffraction intensity" ratio of the silicon nitride-based sintered material of the invention.

5 weight % of yttrium oxide was added to silicon nitride containing 80% α-silicon nitride (manufactured by Advanced Materials Engineering Company of England) as raw material, and n-butanol was further added to the mass, and the resulting mass was ground and mixed using an alumina pot and alumina ball for 70 hours. Thereafter, the resulting powdered mass was drawn out from the pot, and the n-butanol in the mass was removed by being dried. The resulting mass was molded, by the usual pressing method, under a pressure of 500 kg/cm$^2$ into a plate of the dimensions 50 mm(length) × 50 mm(width) × 10 mm(thickness), and this plate molding was embedded in an aluminum nitride powder within a carbon vessel and then put into a heating furnace, and a primary sintering was thus performed at 1750° C for 0.5 to 3 hours in an atmosphere of nitrogen gas. In order to further densify the sintered material thus obtained, it was subjected within a carbon mold to a further sintering under a pressure of 300 kg/cm$^2$ at 1750° C for 2 hours. The sintered material finally obtained was completely densified to have a porosity of 0. This final sintered material was ground and was subjected to a powder X-ray diffraction. As a result, an Si$_3$N$_4$·Y$_2$O$_3$ phase and a β-Si$_3$N$_4$ phase were defected. The previously mentioned "highest X-ray diffraction intensity" ratio was widely varied with the holding time at said primary sintering. FIG. 6 shows the relation between the "highest X-ray diffraction intensity" ratio and the flexural strength at 1300° C of the sintered material. The flexural strength test was carried out by using the three-point bending method under the following conditions:

| Sample size | 3 mm × 3 mm × 40 mm |
|---|---|
| Span | 20 mm |
| Crosshead speed | 0.5 mm/min. |

EXAMPLE 2

Figure 7:
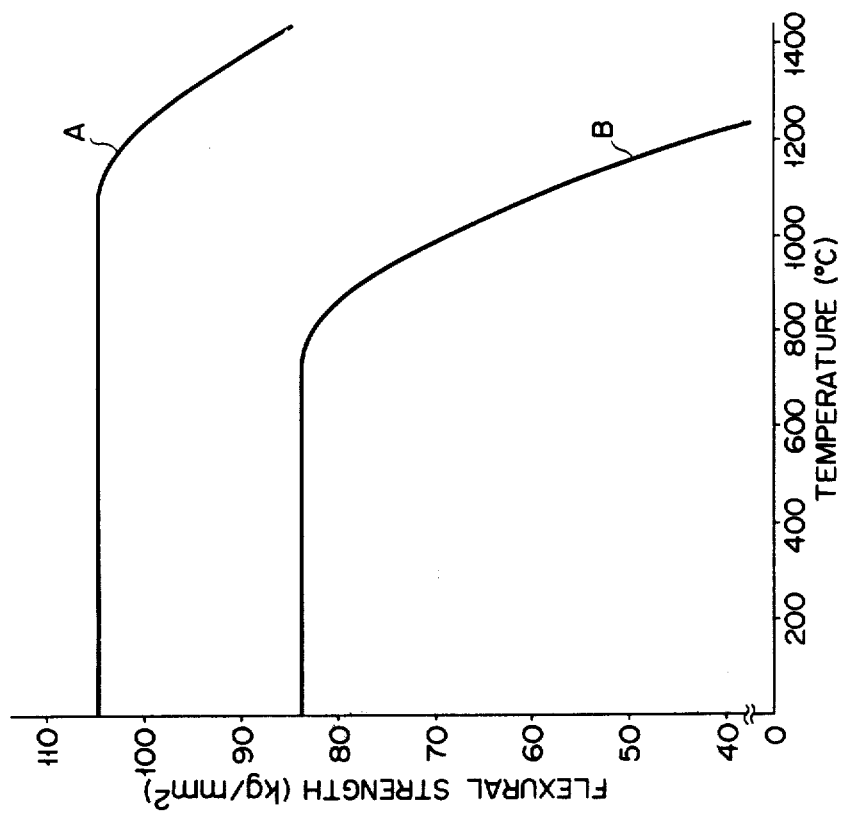
FIG. 7 is a characteristic curve diagram illustrating the relation between the respective flexural strengths of a sintered material of the invention obtained in Example 2 and a prior art sintered material, and temperature.

5 weight % of yttrium oxide was added to silicon nitride containing 88% α-silicon nitride (manufactured by Advanced Materials Engineering Limited of England) as raw material, and the mass was wet-ground and mixed using n-butanol, alumina pot and alumina ball. After the grounded or powdered mass was dried, its particle size was measured by using the Fischer's sub-sieve sizer. As a result, it had a particle size of approximately 0.8μ. This powdered mass was subjected, by the usual method, to a molding under a pressure of 500 kg/cm² to obtain a plate of the dimension 50 mm(length) × 50 mm(width) × 10 mm(thickness). The plate molding thus obtained was covered, within a carbon mold, with an aluminum nitride powder so as to allow the powder layer to have a thickness of approximately 5 mm. The plate molding thus covered was put into a heating furnace and was maintained under a pressure of 400 kg/cm² at 1750° C for 2 hours in an atmosphere of nitrogen gas thereby to perform pressure-sintering. The silicon nitride-based sintered material thus obtained was completely densified and its color was deep-black. When this sintered material was ground and subjected to X-ray diffraction, it was confirmed to have a crystalline phase of $Si_3N_4.Y_2O$. From this sintered material a sample of 3 mm × 3 mm × 40 mm was prepared and was subjected to the flexural strength test as in Example 1, the result being shown by A in FIG. 7. For comparison, the result obtained by subjecting to the flexural strength test that silicon nitride-based sintered material having no crystalline phase which was prepared by adding similarly 5 weight % of yttrium oxide is shown by B in FIG. 7.

The sintered material having a crystalline phase which was prepared in this Example and the prior art sintered material having no crystalline phase were subjected to the oxidation resistance test, the results being shown by A and B in FIG. 8, respectively. It will be seen from FIG. 8 that the silicon nitride-based sintered material of the invention having a crystalline phase is improved in oxidation resistance.

EXAMPLE 3

The molding obtained similarly to Example 2 was covered, within a carbon vessel, with an aluminum nitride powder, and the molding thus covered was put into a heating oven and was maintained at 1750° C for 2 hours in an atmosphere of nitrogen gas thereby to carry out sintering. Since the sintered material thus obtained was insufficient in terms of density, it was further maintained within a carbon mold, in order to be completely densified, under a pressure of 400 kg/cm² at 1750° C for 1 hour in an atmosphere of nitrogen gas. The sintered material thus obtained was in a completely densified condition. This sintered material was ground and then subjected to the X-ray diffraction. As a result, it was recognized to have a crystalline phase as in Example 2, and thereafter was subjected to the flexural strength test. As a result, similar results to Example 2 were obtained.

EXAMPLE 4

Sintering was carried out in the same manner as in Example 3 except that a molding of a powder comprising silicon nitride and a molding of an aluminum nitride powder were juxtaposed with each other within a carbon vessel having a diameter of 100 mm and a depth of 100 mm so as not to contact each other and were primary sintered in a sintering furnace at 1700° C for 3 hours in an atmosphere of nitrogen gas; and thereafter the silicon nitride-based molding thus sintered was subjected to sintering in a carbon mold under a pressure of 400 kg/cm² at 1750° C for 2 hours in an atmosphere of nitrogen gas. The sintered material thus obtained was in a completely densified condition and was subjected to the X-ray diffraction test, flexural strength test and oxidation resistance test, the respective results being the same as those in Example 2.

EXAMPLE 5

An aluminum nitride powder was added to a mixed powder of silicon nitride and yttrium oxide obtained similarly to Example 2 and the resulting powder was uniformly mixed. The amount of said aluminum nitride powder added was 2 weight % based on the amount of the resulting powder. The powder thus obtained was molded, in accordance with the usual method, under a pressure of 300 kg/cm² into a plate of the dimensions 60 mm(length) × 60 mm(width) × 20 mm(thickness), and this plate molding was sintered in a carbon mold under a pressure of 400 kg/cm² at 1650° C for 3 hours in an atmosphere of nitrogen gas. The sintered material thus obtained had a porosity of 0.01 or less, that is, almost completely densified. This sintered material had a crystalline phase and presented substantially similar properties to Example 2.

Where the aluminum nitride powder is added to the mixed powder of silicon nitride and yttrium oxide, the amount of aluminum nitride added preferably ranges from 0.1 weight % to 5.0 weight %. Where the adding amount of aluminum nitride exceeds 5.0 weight %, a reaction of aluminum nitride with silicon nitride is caused due to an increase in the amount of aluminum nitride, so that production of a compound of silicon nitride and yttrium oxide is inhibited. Where the adding amount of aluminum nitride is less than 0.1 weight %, the aluminum nitride can not be effective in producing said compound.

EXAMPLE 6

Sintering was carried out in the same manner as in Example 2 except that a silicon nitride containing 40% α-silicon nitride (manufactured by Nippon Denko Co., Ltd.) as raw material was used. The flexural strength of the sintered material thus obtained was measured similarly to Example 2, the result being shown by A in FIG. 9. For comparison, the flexural strength of a sintered material whose raw material has the same proportion as said sintered material and which has no crystalline phase is shown by B in FIG. 9.

EXAMPLE 7

Sintering was carried out in the same manner as in Example 4 except that a silicon nitride containing 40% α-silicon nitride (manufactured by Nippon Denko Co., Ltd.) as raw material was used. The sintered material thus obtained had a crystalline phase and presented the same flexural strength as in Example 6.

EXAMPLE 8

Sintering was carried out in the same manner as in Example 5 except that a silicon nitride containing 40% α-silicon nitride (manufactured by Nippon Denko Co., Ltd.) as raw material was used. The sintered material thus obtained had a crystalline phase and presented the same flexural strength as in Example 6.

EXAMPLE 9

A silicon metal commercially available (manufactured by Fukuda Metal Foil & Powder Mfg. Company) was ground using an alumina ball mill for 70 hours, and the mass thus ground was heated at 1350° C for 70 hours in an atmosphere of nitrogen gas to obtain a silicon nitride powder. When the ratio of α-silicon nitride to β-silicon nitride of this product was determined by using the X-ray diffraction method, α-silicon nitride was 83% and β-silicon nitride 17%. Sintering was carried out in the same manner as in Example 2 except that 5 weight % of cerium oxide, in place of yttrium oxide, was added to said powder. The sintered material thus obtained was ground and subjected to the powder Xray diffraction. As a result, it was confirmed to have a new phase which can be regarded as a crystalline phase of $Si_3N_4.Ce_2O_3$ or the like. The flexural strength test result was substantially the same as in Example 2.

EXAMPLE 10

5 weight % of cerium oxide was added to a silicon nitride containing 88% α-silicon nitride (manufactured by Advanced Materials Engineering Limited) as raw material and to a silicon nitride containing 40% α-silicon nitride (manufactured by Nippon Denko Co., Ltd.) as raw material, and the respective masses were uniformly mixed. By using separately these two kinds of starting raw materials, eight kinds of sintered materials were prepared in the manners described in Examples 2, 3, 4 and 5. These sintered materials had substantially the same crystalline phases and flexural strengths as in Example 9.

EXAMPLE 11

Four kinds of sintered materials were prepared in the same manner as in Examples 2, 3, 4 and 5, respectively, except that 10 weight % of lanthanum oxide, in place of yttrium oxide, was used. The sintered materials thus obtained all had a new crystalline phase which had not been detected from the prior art sintered material. The respective flexural strength test results were the same as in Example 9.

EXAMPLE 12

Four kinds of sintered materials were prepared in the same manner as in Example 11 except that 15 weight % of praseodymium oxide, in place of yttrium oxide, was used. The sintered materials thus obtained all had a new crystalline phase which had not been detected from the prior art sintered material. The respective flexural strength test results were the same as in Example 9.

What we claim is:

1. A silicon nitride-based sintered material containing silicon yttrium oxynitride crystal compounds prepared from silicon nitride and yttrium oxide, wherein the amount of yttrium present in said crystal compounds is 50 wt% or more based on the total amount of yttrium contained in said silicon nitride-based sintered material.

2. A silicon nitride-based sintered material containing a silicon yttrium oxynitride crystal compound prepared from silicon nitride and yttrium oxide, wherein said crystal compound is $Si_3N_4.Y_2O_3$.

3. A silicon nitride-based sintered material according to claim 2, characterized in that, in a powder X-ray diffraction of said silicon nitride-based sintered material, the ratio of the highest X-ray diffraction intensity value of the $Si_3N_4.Y_2O_3$ to the highest X-ray diffraction intensity value of $\beta$-$Si_3N_4$ is in the range of 0.02 to 2.00.

4. A silicon nitride-based sintered material according to claim 1, characterized in that it contains $Si_3N_4.Y_2O_3$ as one of said crystal compounds prepared from silicon nitride and yttrium oxide; and in its powder X-ray diffraction the ratio of the highest X-ray diffraction intensity value of the $Si_3N_4.Y_2O_3$ to the highest X-ray diffraction intensity value of $\beta$-$Si_3N_4$ is in the range of 0.02 to 2.00.

5. A sintered material consisting essentially of silicon nitride, yttrium oxide and silicon yttrium oxynitride crystalline compounds, wherein at least 50% of the total yttrium content in the sintered material is present in said crystalline silicon yttrium oxynitride compound.

6. The sintered material of claim 5, which has been prepared by heat treating a mixture of silicon nitride and yttrium oxide in the presence of aluminum nitride at a temperature of from 1650° to 1800° C.

7. The sintered material of claim 5, wherein at least 70% of the total yttrium content of the sintered material is present in the crystalline silicon yttrium oxynitride compound.

8. The sintered material of claim 5, wherein the silicon yttrium oxynitride compound has the formula $Si_3N_4.Y_2O_3$.

9. The sintered material of claim 5, characterized by the ratio of the highest X-ray diffraction intensity value of the $Si_3N_4.Y_2O_3$ to the highest X-ray diffraction intensity value of $\beta$-$Si_3N_4$ of from 0.02 to 2.00, as determined by powder X-ray diffraction.

* * * * *